Jan. 3, 1956  J. L. KALLUS  2,728,980
METHOD FOR PRODUCING MOLDS FOR MAKING DOLLS
COMPOSED OF PLASTIC MATERIAL
Filed Sept. 10, 1953  2 Sheets-Sheet 1
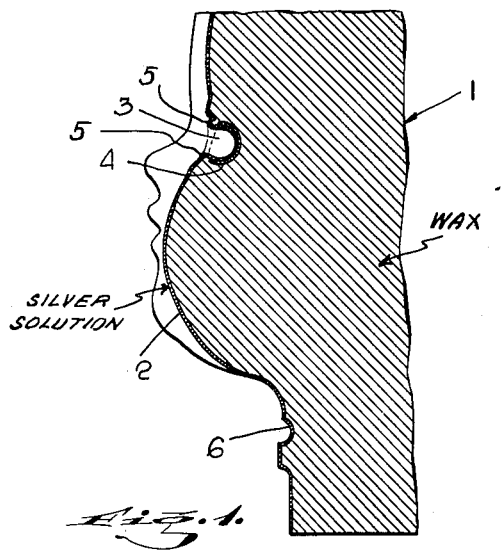
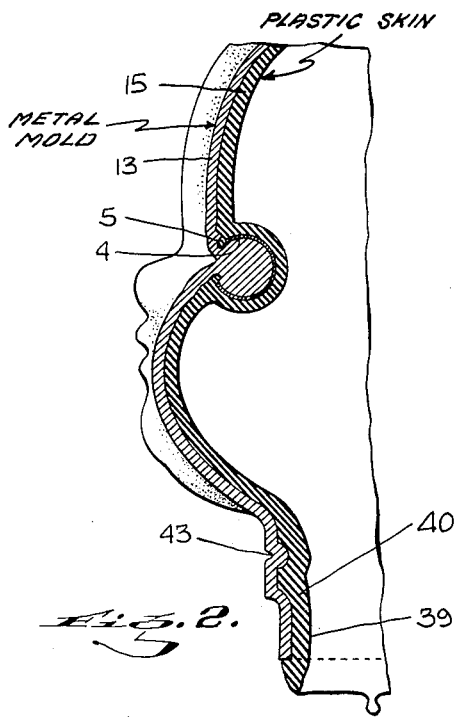
INVENTOR
JOSEPH L. KALLUS
BY
his ATTORNEY Jan. 3, 1956  J. L. KALLUS  2,728,980
METHOD FOR PRODUCING MOLDS FOR MAKING DOLLS
COMPOSED OF PLASTIC MATERIAL
Filed Sept. 10, 1953  2 Sheets-Sheet 2

INVENTOR.
JOSEPH L. KALLUS
BY Gustav Drews
his ATTORNEY

United States Patent Office 2,728,980
Patented Jan. 3, 1956

2,728,980

METHOD FOR PRODUCING MOLDS FOR MAKING DOLLS COMPOSED OF PLASTIC MATERIAL

Joseph L. Kallus, Brooklyn, N. Y.

Application September 10, 1953, Serial No. 379,454

4 Claims. (Cl. 29—458)

This invention relates to methods for producing molds for making dolls composed of plastic material, such as plastisol or the like, and constitutes a continuation in part of application for patent Ser. No. 227,610 filed May 22, 1951.

Among the objects of the present invention, it is aimed to provide a method for producing an improved mold for making dolls composed of plastic material, such as plastisol and the like, whereby as an instance a one-piece body member and a one-piece head member may be formed which is soft and flexible and approaches the sense of touch of the human skin, and which doll portions may be equipped with recesses and openings to receive elements such as eyes, and the like.

With compositions such as rubber, as an instance, due to the process steps of forming such dolls composed of rubber, it was necessary to form the molds in halves which always presented a problem of removing the protrusion or rib at the seam where the mold halves engaged, aside from the extra labor and expense in carrying out such additional step.

Although it has been known to make one-piece doll portions, such as the head member, and the like from resilient plastic material, difficulty has heretofore been encountered in securing to the same, eye inserts, and the like. The difficulty was due primarily to the problem of forming recesses of the desired contour and conformation. To this end, the present invention aims to provide an improved method for producing a mold which will facilitate the formation of a one-piece head of a doll composed of a substance such as plastisol and the like, with recesses to accommodate eye inserts, and the like.

These and other features, capabilities and advantages of the present invention will appear from the subjoined detailed description of specific embodiments of the improved mold and also of the parts used to form the mold of the present invention illustrated in the accompanying drawings, in which Fig. 1 is a fragmental sectional view of the head part of a wax model coated with a suitable metal preparatory to the electroplating treatment.

Fig. 2 is a fragmental sectional view of the head part of a mold after the plastic skin has been formed inside of the same, but before the skin has been removed from the mold.

Figure 3:
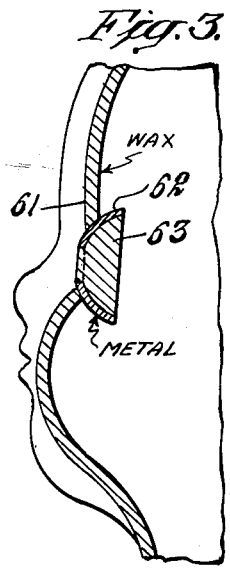
Fig. 3 is a fragmental sectional view of the head portion of another embodiment of a head model.

To form the mold according to the present invention, it is necessary, see Fig. 1, to form a lost wax model composed of a readily fusible wax, such as electroplater's wax and then to cover the model with a coat of some metal, such as a solution of silver nitrate conventionally used for electroplating with copper by the interaction while in flight of a spray of silver nitrate and a spray of a reducing agent resulting in a conductive silver deposit on the surface of the wax model. In Fig. 1 the wax model part 1 is shaped to form a doll's head of the doll structure which is covered with a coating 2 of some dielectric metal such as results from reducing the conventional silver nitrate solution used for electroplating copper. Here attention is particularly called to the recess 3 formed to emulate the eye socket to receive the independent metal protuberance, such as the metal insert 4 which is inserted into the model 1 so that a rib 5 is formed around the insert 4. At the neck there is formed an annular recess 6 in the model 1.

Obviously, instead of a silver nitrate solution, other coatings may be used depending upon the electroplating deposit, such for instance as a nickel or chromium deposit. Thereupon the head 1 produced with its inserts 4 and coating 2 is introduced into the electrolytic bath, and depending upon the thickness desired for the mold wall 13, see Fig. 2, the wax model 1 is retained in the bath a greater or less period of time. When the desired thickness of mold wall 13 has been produced, the model 1 is removed from the bath and then heated to the temperature desired to melt the wax in the model 1, which melted wax is then poured out of the mold when the mold 13 is ready for use. Preferably, however, before proceeding to form a doll head it is then desired to cool the mold 13 to a temperature approximating 100° F. or less. If the mold had previously been made and kept in stock, then it is desired to heat the mold 13 so that it has a temperature of about 100° F. Thereupon a plastic mass is poured into the mold 13. Preferably when the plastic mass has so been introduced into the mold 13, the mold is rocked to and fro, an action known as slushing in the technique, to enable the plastic mass intimately to contact the entire inner surface of the mold 13. Due to the consistency of the plastic mass, especially when having a temperature of about 70° F., and the mold is approximately 100° F., a substantial layer 15 of the plastic mass will adhere and cling to the inner face of the mold 13, so that the excess can be poured out and a substantial layer will remain clinging throughout to the inner wall of the mold 13. Excellent results have been achieved when the plastic mass consists of a mixture of polyvinyl chloride resin, dioctyl phthalate, diisoctyl adipate, and santicizer. After the excess has so been poured out, the mold 13 with its inner layer 15 is heated to a temperature of about 370° F. for about five minutes. Thereupon the mold 13 is removed from the heater and sprayed with water of about 70° F. for about one minute. Thereupon the layer 15 will have been coagulated or cured and be in condition to be stripped, intact, from the inner face of the mold 13.

One of the features of the present invention consists in forming a mold having unusual intricate contours, particularly if the contours include deep crevices or pockets or even elongated pockets. When the mold calls for intricate contours such as are required to form eye sockets, it has been found desirable to insert and partially embed in the wax model 1 as aforesaid, the metal inserts 4 which may be machine cut to the precise contour required. If the metal inserts 4 are composed of copper or brass, then when the electroplating process ensues, the wall of the mold 13 will unite with the inserts 4, and the inserts 4 will become an integral part, or at least a fixed part, of the mold 13.

In the formation of these skins it was also discovered that an electroplate deposit would not produce a precisely contoured pocket beyond a certain depth. In other words, beyond a certain depth the inner end or bottom of the socket would attract either a very thin deposit as compared to the rest of the mold, or else the corners adjacent the bottom would disappear, the sharp corners being filled with deposits so there eventually would appear a slope or incline between the side walls and the bottom of the socket and eliminate any resemblance to the original sharp corner socket such as might be formed between a cylinder and its base. The present invention aims to overcome this difficulty.

Excellent results have been achieved when the thickness of the mold wall 13 approximated between .070 and .090 of an inch and the thickness of the skin 15 approximated between .085 and .125 of an inch.

Obviously the metal insert 4 shown in Fig. 2 need not be chambered but could be solid, and need not be spherical even when used to form sockets for receiving eye reproductions, but could be comparatively shallow inserts, of oval or other form in cross section.

Figure 4:
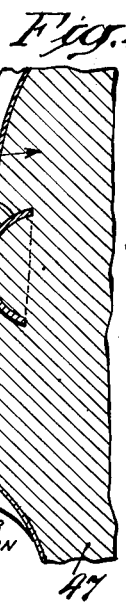
Figs. 4, 5, 6 and 7 illustrate in fragmental sectional views four successive stages of a third method for forming the mold and use thereof, Fig. 4 of the wax model with a dielectric deposit, Fig. 5 of the wax model with the electroplated metal deposit, Fig. 6 with the bulbous protuberance secured in place and wax removed, and Fig. 7 with the plastic skin deposit in place.

As an instance, in the embodiment shown in Figs. 4 to 7, inclusive, in the form of a mold for a doll's head in the solid block of wax 47 there is inserted the metal insert 48, where the eye formations are located, consisting, as an instance, of a segment of a spherical metal shell or metal seat forming devices having a concave or other shaped seat forming face and having an opening 49 in said shell 48, with the wax 47 disposed not only inside of the shell 48 but extending into the opening 49 with the dielectric coating 50, such as a silver solution shown in section in Fig. 4. The outer opening 49 of the shell 48 is spaced radially inward from the recess or opening formed in the wax 47 adjacent thereto. In turn, the inner annular edge of each shell 48 is larger than the opening defining the location of an eye reproduction in the wax.

Figure 5:
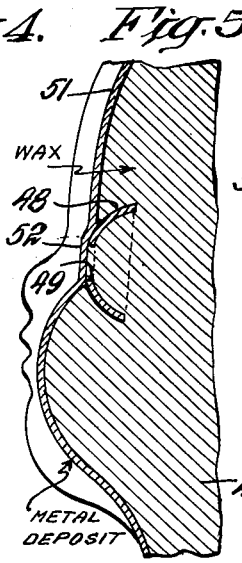

In Fig. 5, the succeeding stage of the method is illustrated in which the electroplated metal deposit 51 has combined with the coating 50 to form the mold wall showing a wall portion 52 extending across the opening 49 in the shell 48 and the shell 48 attached to the wall 51 by the electroplated wall portion 52.

Figure 6:
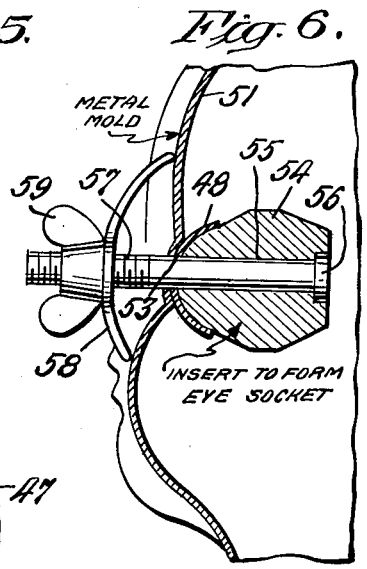

In Fig. 6, the mold wall 51 and shell 48 have been freed from the wax 47, and the opening 53 drilled to remove what appeared as the wall portion 52 in Fig. 5, a bulbous eye socket forming protuberance 54 secured to the shell 48 by a pin 55 extending through the protuberance 54 having a head 56 on its inner end abutting against the inner end of the protuberance 54 and the shank 57 of the pin 55 extending from the protuberance through the opening 53 and then through the anchoring plate 58, the shank 57 being threaded to receive a screw or the like such as the wing nut 59 to draw the protuberance into secure position.

Figure 7:
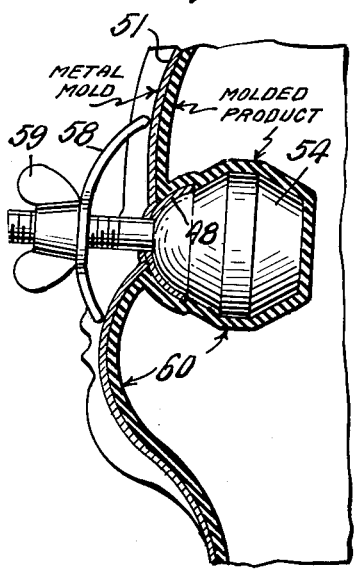

In Fig. 7, there is illustrated the plastic skin or molded product 60 deposited on the inner face of the mold wall 51 and outer face of the shell 48 and protuberance 54.

The embodiment illustrated in Fig. 3 differs from the embodiment illustrated in Fig. 4 primarily in that the wax model has been chambered to form the wall 61 and the metal shell 62 pressed into place and filled with wax as at 63.

Figure 8:
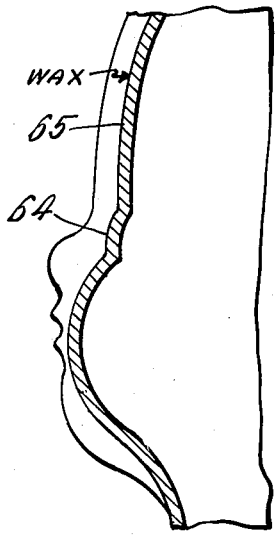
Figs. 8 and 9 illustrate in fragmental sectional views two not successive stages of a fourth method for forming the mold and use thereof, Fig. 8 of the wax model and Fig. 9 of the final mold with the wax removed.
Figure 9:
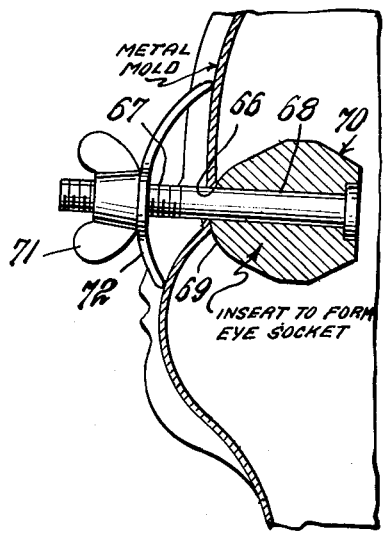

In the embodiment shown in Figs. 8 and 9, the location for the bulbous protuberance is defined by the wax wall 64 in a chambered wax wall 65 similar to the chambered wax wall 61 of the embodiment illustrated in Fig. 3 except that here, the metal insert 62 is omitted, and the opening 66, see Fig. 9 cut through the wall portion formed adjacent the wall 64, Fig. 8, of the wax wall 65 to receive the shank 67 of the pin 68. The edge of the opening 66 around the depression formed by the wall portion 64 of Fig. 8 forms the seat for the outer end 69 of the bulbous protuberance 70.

Obviously the bulbous protuberance 70 may be a chambered shell instead of a solid piece. However, whether solid or chambered, the bulbous protuberance 70, as well as the shell 48, should preferably be composed of copper or brass on account of their ability readily to conduct heat.

It is obvious that various changes and modifications may be made in the steps of the method without departing from the general spirit of the invention as set forth in the appended claims.

I claim:

1. The method of manufacturing a chambered mold having an inner mold face for a chambered plastic doll head consisting in forming a wax model, inserting independent metal parts having concave inner seat forming faces into such wax model with outer exposed portions of the independent metal parts supplementing the outer face of the wax model, coating the outer face of the wax model and the outer exposed portions of the independent metal parts with a conductive metal, thereupon electrodepositing a metal on said outer face of the wax model and said outer exposed portions of the independent metal parts to anchor the independent metal parts to the electrodeposited metal wall, thereupon removing the wax from the interior of the mold wall, positioning bulbous metal protuberances on the concave inner faces of the independent metal parts extending from the inner face of the electrodeposited metal wall, and extending connecting means through the electrodeposited metal wall and independent metal parts, and connecting the bulbous metal protuberances in place on said independent metal parts to constitute socket forming protuberances in the mold to enable the faces of said protuberances to supplement the metal wall to complete the inner mold face.

2. The method of manufacturing chambered molds for chambered plastic doll heads consisting in forming a wax model having openings where the eye reproductions are to be located, inserting independent spherical shaped metal parts having inner concave faces and outer convex faces into such wax model at the openings where the eye reproductions are to be located to form deep spherical sockets with exposed convex surfaces of the metal parts supplementing the outer face of the wax model, the metal parts each having an outer opening, the edges of which outer openings in said metal parts are spaced radially from the adjacent openings formed in the wax model where the eye reproductions are to be located, the metal parts having inner annular edges larger in diameter than the diameter of the edges of the adjacent openings in the wax model to accommodate thin annular ribs of wax around the eye sockets, coating said outer face of the wax model and said exposed concave surfaces of the independent metal parts with a silver deposit, thereupon electrodepositing a metal on said silver deposit to anchor the independent metal parts to the electrodeposited metal wall, thereupon removing the wax from the interior of the mold wall, positioning bulbous metal protuberances on the concave inner surfaces of the independent metal parts extending from the inner face of the electrodeposited metal mold wall, and extending connecting means through the electrodeposited metal mold wall and independent metal parts, and connecting the bulbous metal protuberances in place on said independent metal parts to constitute socket forming protuberances in the mold to enable the faces of said protuberances to supplement the mold wall to complete the inner mold face.

3. The method of producing a mold having an inner mold face for a chambered plastic doll head or the like consisting in forming a wax model having convex formations where the eye reproductions are to be located, coating the model with a conductive metal, thereupon electrodepositing a metal on the so coated outer face of the wax model to form the mold wall and forming concave inner seats where the eye reproductions are to be located, thereupon removing the wax from the interior of the mold wall, positioning bulbous metal protuberances in said concave seats, and extending connecting means through the electrodeposited metal mold wall and said protuberances and connecting said bulbous metal protuberances in place in said concave seats to constitute socket forming protuberances in the mold to enable the faces of said protuberances to supplement the metal mold wall to complete the inner mold face.

4. The method of producing a mold having an inner mold face for a chambered plastic doll head or the like consisting in forming a wax model having convex formations where the eye reproductions are to be located, coating the model with a conductive metal, thereupon electrodepositing a metal on the so coated outer face of the wax model to form the mold wall and forming predetermined inner seats where the eye reproductions are to be located, thereupon removing the wax from the interior of the mold wall, positioning bulbous metal protuberances in said predetermined seats, and extending connecting means through the electrodeposited metal mold wall and said protuberances and connecting said bulbous metal protuberances in place in said predetermined seats to constitute socket forming protuberances in the mold to enable the faces of said protuberances to supplement the metal mold wall to complete the inner mold face.

References Cited in the file of this patent

UNITED STATES PATENTS

| | | |
|---|---|---|
| 691,803 | Patton | Jan. 28, 1902 |
| 1,316,272 | Clark | Sept. 16, 1919 |
| 1,798,279 | Slight | Mar. 31, 1931 |
| 2,024,521 | Harrison | Dec. 17, 1935 |
| 2,182,775 | Abouchar | Dec. 12, 1939 |
| 2,217,164 | Gongolsky | Oct. 8, 1940 |